US012762744B2

(12) United States Patent
Qiu et al.

(10) Patent No.: US 12,762,744 B2
(45) Date of Patent: Oct. 13, 2026

(54) SHOOTING CALIBRATION METHOD, SYSTEM, EQUIPMENT AND STORAGE MEDIUM

(71) Applicant: GOERTEK INC., Weifang (CN)

(72) Inventors: Xudong Qiu, Weifang (CN); Li Zhang, Weifang (CN)

(73) Assignee: GOERTEK INC., Weifang (CN)

( * ) Notice: Subject to any disclaimer, the term of this patent is extended or adjusted under 35 U.S.C. 154(b) by 117 days.

(21) Appl. No.: 18/820,957

(22) Filed: Aug. 30, 2024

(65) Prior Publication Data

US 2024/0428460 A1 Dec. 26, 2024

Related U.S. Application Data

(63) Continuation of application No. PCT/CN2022/102382, filed on Jun. 29, 2022.

(30) Foreign Application Priority Data

Apr. 25, 2022 (CN) ......................... 202210438331.8

(51) Int. Cl.
*G06T 5/50* (2006.01)
*G06T 3/14* (2024.01)
(Continued)

(52) U.S. Cl.
CPC .................. *G06T 7/80* (2017.01); *G06T 3/14* (2024.01); *G06T 3/40* (2013.01); *G06T 7/194* (2017.01); *G06T 7/30* (2017.01)

(58) Field of Classification Search
CPC .......... G06T 7/80; G06T 7/194; H04N 23/617
(Continued)

(56) References Cited

U.S. PATENT DOCUMENTS

2012/0038663 A1* 2/2012 Gustafsson .............. G09G 5/00 345/629
2018/0249062 A1* 8/2018 Jin ......................... H04N 5/272
(Continued)

FOREIGN PATENT DOCUMENTS

CN 110782499 A 2/2020
CN 113518189 A 10/2021
(Continued)

OTHER PUBLICATIONS

First Office Action issued in Chinese Patent Application No. 202210438331.8, mailed Mar. 22, 2024, 21 pages.
(Continued)

*Primary Examiner* — Samantha (Yuehan) Wang
(74) *Attorney, Agent, or Firm* — HAUPTMAN HAM, LLP

(57) ABSTRACT

Disclosed are a shooting calibration method, a system, an equipment and a storage medium. The shooting calibration method is applied to a shooting calibration system which includes an electronic equipment and a wearable equipment. The shooting calibration method includes: shooting, by the electronic equipment, a first target image, and sending the first target image to the wearable equipment; receiving, by the wearable equipment, the first target image sent by the electronic equipment; and in response to that the first target image does not overlap with a second target image observed through the wearable equipment, adjusting an image size parameter of the first target image, and returning to execute a step of sending the first target image to the wearable equipment until the first target image overlaps with the second target image, and obtaining a target adjustment parameter.

8 Claims, 6 Drawing Sheets

(51) Int. Cl.

| | |
|---|---|
| ***G06T 3/40*** | (2006.01) |
| ***G06T 7/194*** | (2017.01) |
| ***G06T 7/30*** | (2017.01) |
| ***G06T 7/80*** | (2017.01) |

(58) Field of Classification Search
USPC .......................................................... 345/629
See application file for complete search history.

(56) References Cited

U.S. PATENT DOCUMENTS

| | | | |
|---|---|---|---|
| 2021/0124174 | A1 | 4/2021 | Tokunaga et al. |
| 2021/0358457 | A1* | 11/2021 | Maeng .................. G06T 7/0002 |
| 2023/0162398 | A1* | 5/2023 | Varekamp ............ H04N 13/128 348/187 |

FOREIGN PATENT DOCUMENTS

| | | | |
|---|---|---|---|
| JP | 2019121074 | A | 7/2019 |
| WO | 2013128612 | A1 | 9/2013 |
| WO | 2018227098 | A1 | 12/2018 |

OTHER PUBLICATIONS

Notice of Grant issued in Chinese Patent Application No. 202210438331.8, mailed Aug. 9, 2024, 3 pages.
International Search Report and Written Opinion issued in PCT/CN2022/102382, mailed Nov. 16, 2022, 12 pages.

* cited by examiner

SHOOTING CALIBRATION METHOD, SYSTEM, EQUIPMENT AND STORAGE MEDIUM

CROSS-REFERENCE TO RELATED APPLICATIONS

The present application is a continuation application of International Application No. PCT/CN2022/102382, filed on Jun. 29, 2022, which claims priority to Chinese Patent Application No. 202210438331.8, filed on Apr. 25, 2022. The disclosures of the above-mentioned applications are incorporated herein by reference in their entireties.

TECHNICAL FIELD

The present application relates to the technical field of image processing, and in particular to a shooting calibration method, a system, an equipment and a storage medium.

BACKGROUND

Virtual reality (VR) shooting is a shooting method that synthesizes a target with a virtual scene. When performing VR shooting, an electronic equipment and a head-mounted equipment are required. After the electronic equipment shoots a first target image, it is necessary to remove the background from the first target image and synthesize it with the virtual background of the head-mounted equipment. However, the first target image shot through the electronic equipment may not match the virtual background in the head-mounted equipment. For example, the size of the first target image is much larger than or smaller than the size of the virtual background, resulting in huge difference between the background and the target, which in turn leads to a poor user experience.

SUMMARY

The main purpose of the present application is to provide a shooting calibration method, a system, an equipment and a storage medium, aiming to solve the technical problem in the related art that the first target image shot through the electronic equipment may not match the virtual background in the head-mounted equipment, resulting in a poor user experience.

In order to achieve the above objectives, the present application provides a shooting calibration method, applied to a shooting calibration system. The shooting calibration system includes an electronic equipment and a wearable equipment, and the electronic equipment is communicated with the wearable equipment. The shooting calibration method includes:

- shooting, by the electronic equipment, a first target image, and sending the first target image to the wearable equipment;
- receiving, by the wearable equipment, the first target image sent by the electronic equipment; and
- in response to that the first target image does not overlap with a second target image observed through the wearable equipment, adjusting an image size parameter of the first target image, and returning to execute a step of sending the first target image to the wearable equipment until the first target image overlaps with the second target image, and obtaining a target adjustment parameter.

In an embodiment, a shooting angle corresponding to a camera of the electronic equipment is consistent with a shooting angle corresponding to the wearable equipment, and a shooting sight corresponding to the camera of the electronic equipment is consistent with a shooting sight corresponding to the wearable equipment.

In an embodiment, the shooting, by the electronic equipment, the first target image, and sending the first target image to the wearable equipment includes:

- shooting, by a camera of the electronic equipment, a preset target, to obtain a target image; and
- removing background of the target image to obtain the first target image, and transmitting the first target image to the wearable equipment.

In an embodiment, after the receiving, by the wearable equipment, the first target image sent by the electronic equipment, the shooting calibration method further includes:

- projecting the first target image on a lens screen of the wearable equipment;
- determining a offset between the second target image and the first target image; and
- performing image offset compensation on the first target image based on the offset, to determine whether the second target image overlaps with the first target image after the offset compensation.

In an embodiment, the in response to that the first target image does not overlap with the second target image observed through the wearable equipment, adjusting the image size parameter of the first target image, and returning to execute the step of sending the first target image to the wearable equipment until the first target image overlaps with the second target image, and obtaining the target adjustment parameter includes:

- in response to that a size of the first target image is smaller than a size of the second target image, increasing a image size parameter of the first target image to obtain the first target image after parameter adjustment; and
- returning to execute the step of sending the first target image to the wearable equipment until the first target image overlaps with the second target image, and configuring an image size parameter corresponding to an overlapped image as the target adjustment parameter.

In an embodiment, the in response to that the first target image does not overlap with the second target image observed through the wearable equipment, adjusting the image size parameter of the first target image, and returning to execute the step of sending the first target image to the wearable equipment until the first target image overlaps with the second target image, and obtaining the target adjustment parameter includes:

- in response to that a size of the first target image is larger than a size of the second target image, reducing the image size parameter of the first target image to obtain the first target image after parameter adjustment; and
- returning to execute the step of sending the first target image to the wearable equipment until the first target image overlaps with the second target image, and configuring an image size parameter corresponding to an overlapped image as the target adjustment parameter.

In an embodiment, after the in response to that the first target image does not overlap with the second target image observed through the wearable equipment, adjusting the image size parameter of the first target image, and returning to execute the step of sending the first target image to the wearable equipment until the first target image overlaps with the second target image, and obtaining the target adjustment parameter, the shooting calibration method further includes:

calibrating a camera of the electronic equipment based on the target adjustment parameter;

sending an environment virtual image to a calibrated electronic equipment based on the environment virtual image shot by the wearable equipment in a virtual space; and based on a target image shot through the calibrated electronic equipment and the environment virtual image sent by the wearable equipment, superimposing the environment virtual image and the target image to obtain a composite image.

The present application further provides a shooting calibration system, which is a virtual system and includes:

a sending module, configured to obtain a first target image shot by the electronic equipment, and send the first target image to the wearable equipment;

a receiving module, configured to receive the first target image sent by the electronic equipment through the wearable equipment; and an adjustment module, configured to adjust an image size parameter of the first target image in response to that the first target image does not overlap with a second target image observed through the wearable equipment, and return to execute a step of sending the first target image to the wearable equipment until the first target image overlaps with the second target image, and obtain a target adjustment parameter.

The present application further provides an electronic equipment, which is a physical equipment and includes a camera, a memory, a processor, and a shooting calibration program stored in the memory. When the shooting calibration program is executed by the processor, the shooting calibration method as mentioned above is implemented.

The present application further provides a storage medium. The storage medium is a non-transitory computer-readable storage medium, a shooting calibration program is stored on the non-transitory computer-readable storage medium, and when the shooting calibration program is executed by a processor, the shooting calibration method as mentioned above is implemented.

The present application provides a shooting calibration method, a system, an equipment and a storage medium. First, the electronic equipment shoots a first target image, and sends the first target image to the wearable equipment. The wearable equipment receives the first target image sent by the electronic equipment. If the first target image does not overlap with a second target image observed through the wearable equipment, an image size parameter of the first target image is adjusted, and then it will return to execute a step of sending the first target image to the wearable equipment until the first target image overlaps with the second target image, and obtaining a target adjustment parameter. The second target image observed through the wearable equipment through the lens is compared with the first target image shot through the electronic equipment. When there is no overlap between the second target image and the first target image, the first target image of the electronic equipment is adjusted until the first target image shot through the electronic equipment can overlap with the second target image observed through the wearable equipment, and the target adjustment parameter of the overlapped image is recorded. Based on the target adjustment parameter, the camera of the electronic equipment is calibrated, so that the calibrated camera can match with the size of the object in the virtual environment regardless of the angle the calibrated camera turns to, thereby improving the user experience.

BRIEF DESCRIPTION OF THE DRAWINGS

Drawings herein are incorporated into the specification and constitute a part of the specification, showing embodiments consistent with the present application, and are used to explain the principles of the present application in conjunction with the specification.

To more clearly illustrate technical solutions in the embodiments of the present application or the related art, the following will briefly introduce the drawings that need to be used in the description of the embodiments or the related art. Obviously, for those skilled in the art, without creative effort, other drawings can be obtained according to these drawings.

The realization of the objective, functional characteristics, and advantages of the present application are further described with reference to the accompanying drawings.

DETAILED DESCRIPTION OF THE EMBODIMENTS

It should be understood that the specific embodiments described herein are only used to explain the present application and are not used to limit the present application.

The main technical solution of the embodiments of the present application is: shooting, by the electronic equipment, a first target image, and sending the first target image to the wearable equipment; receiving, by the wearable equipment, the first target image sent by the electronic equipment; and in response to that the first target image does not overlap with a second target image observed through the wearable equipment, adjusting an image size parameter of the first target image, and returning to execute a step of sending the first target image to the wearable equipment until the first target image overlaps with the second target image, and obtaining a target adjustment parameter. Therefore, the calibrated camera can match with the size of the object in the virtual environment regardless of the angle the calibrated camera turns to, thereby improving the user experience.

Figure 1:
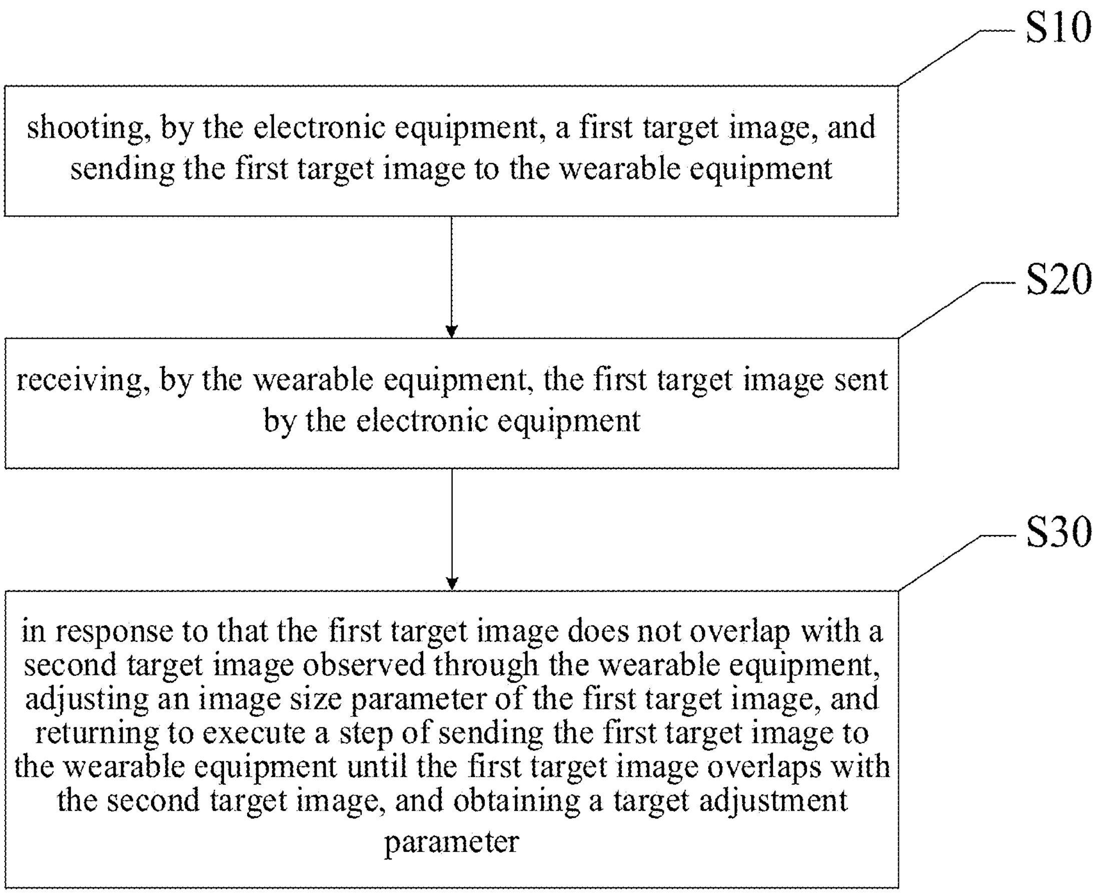
FIG. 1 is a flowchart of the shooting calibration method according to a first embodiment of the present application.

In an embodiment, with reference to FIG. 1, an embodiment of the present application provides a shooting calibration method. In the first embodiment of the present application, the shooting calibration method includes following steps.

Step S10, shooting, by the electronic equipment, a first target image, and sending the first target image to the wearable equipment.

Figure 2:
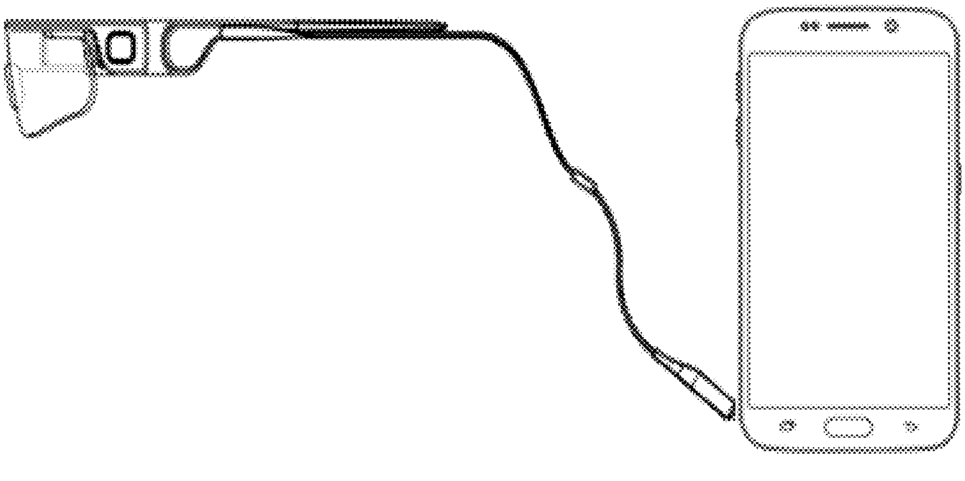
FIG. 2 is a communication principle diagram of the electronic equipment and the wearable equipment according to an embodiment of the present application.

In this embodiment, it should be noted that the wearable equipment includes a virtual reality (VR) equipment, an augmented reality (AR) equipment, and other equipments. In an embodiment, the wearable equipment is a head-mounted equipment. The electronic equipment can be a mobile phone, a tablet computer, a camera, and the like. The electronic equipment is provided with a camera. As shown in FIG. 2, which is a communication principle diagram of the electronic equipment and the wearable equipment according to an embodiment of the present application. The electronic equipment and the wearable equipment are connected to each other through a preset communication interface. The preset communication interface includes but is not limited to a network port, a universal serial bus USB interface, a serial port, a video graphics array (VGA) interface, an high definition multimedia (HDMI) wired interface, WiFi, Bluetooth wireless interface and other interfaces.

It should be further explained that the shooting sights corresponding to the camera of the electronic equipment are the same as the shooting sights corresponding to the wearable equipment, and shooting angles corresponding to the camera of the electronic equipment are the same as the shooting angles corresponding to the wearable equipment. The user can observe the image of the preset target through the lens of the wearable equipment, and the first target image is an image that includes the preset target. The preset target includes a person, an animal or a real scene, and the like The target image of the preset target is obtained by shooting with the camera of the electronic equipment, and then foreground/rear view separation is performed in the target image to obtain a foreground image, and the foreground image is used as the first target image. Then the first target image is transmitted to the wearable equipment.

The above step S10, shooting, by the electronic equipment, a first target image, and sending the first target image to the wearable equipment includes following steps.

Step S11, shooting, by a camera of the electronic equipment, a preset target, to obtain a target image.

Step S12, removing background of the target image to obtain the first target image, and transmitting the first target image to the wearable equipment.

In this embodiment, the preset target is firstly shot through the camera of the electronic equipment according to the preset shooting angle and the shooting sight to obtain the target image, and then the background of the target image is removed through the preset foreground/background separation method. For example, the foreground/background of the target image obtained by the camera is separated by the optical flow algorithm/low-rank decomposition/mixed Gaussian modeling algorithm, to obtain the background of the first target image. The first target image is uploaded to the wearable equipment to project the first target image on the lens of the wearable equipment.

Step S20, receiving, by the wearable equipment, the first target image sent by the electronic equipment.

After the above step S20, receiving, by the wearable equipment, the first target image sent by the electronic equipment, the shooting calibration method further includes following steps.

Step A10, projecting the first target image on a lens screen of the wearable equipment.

Step A20, determining a offset between the second target image and the first target image.

Step A30, performing image offset compensation on the first target image based on the offset, to determine whether the second target image overlaps with the offset-compensated first target image.

In this embodiment, it should be noted that, for the imaging principle of the wearable equipment, there will be an offset between the image projected onto the wearable equipment and the image observed through the wearable equipment. In an embodiment, the wearable equipment receives the first target image sent by the electronic equipment, and then analyzes the first target image. Based on the imaging focal length designed by the wearable equipment, the offset of the first target image with reference to the second target image observed through the wearable equipment can be calculated. Based on the offset, image offset compensation is performed on the first target image during imaging, so that the user can observe the offset-compensated first target image on the lens screen of the wearable equipment, thereby more accurately judging whether the second target image overlaps with the offset-compensated first target image.

Step S30, in response to that the first target image does not overlap with a second target image observed through the wearable equipment, adjusting an image size parameter of the first target image, and returning to execute a step of sending the first target image to the wearable equipment until the first target image overlaps with the second target image, and obtaining a target adjustment parameter.

In this embodiment, it should be noted that, in one possible implementation, the time that the user observes the second target image through the lens of the wearable equipment is the same as the time that the electronic equipment shoots the first target image. In an embodiment, after wearing the wearable equipment, the user will adjust the wearable equipment to make the shooting sight of the wearable equipment facing the preset target consistent with the shooting sight of the electronic equipment facing the preset target, and make the shooting angle of the wearable equipment facing the preset target consistent with the shooting angle of the electronic equipment facing the preset target. Then the preset target is shot through the electronic equipment to obtain the corresponding first target image, and the second target image is obtained by observing the preset target through the wearable equipment. In another possible implementation, the time that the user observes the second target image through the lens of the wearable equipment is different from the time that the electronic equipment shoots the target. In an embodiment, when the electronic equipment obtains the shooting instruction, the preset target is shot through the electronic equipment to obtain the target image, and then the background of the target image is removed to obtain the first target image. The first target image is stored. Then, when the user wears the wearable equipment, the electronic equipment sends the stored first target image to the wearable equipment, and displays the first target image on the lens of the wearable equipment. Then the shooting angle and the shooting sight of the wearable equipment are adjusted to be the same as the shooting angle and the shooting sight of the electronic equipment, to obtain the second target image of the preset target observed by the human eye.

Figure 3:
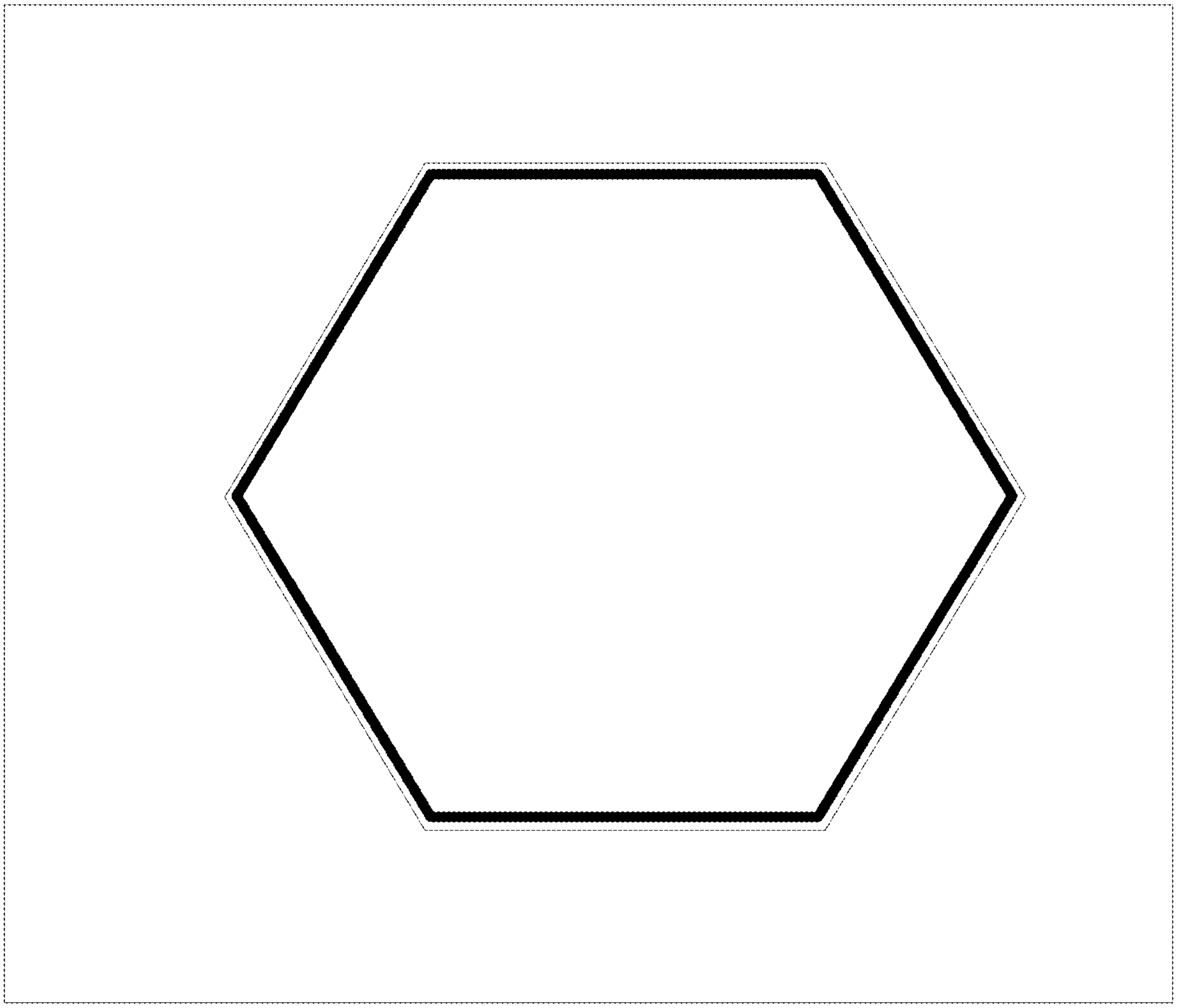
FIG. 3 is a schematic diagram showing that the first target image being overlapped with the second target image according to an embodiment of the present application.

In an embodiment, the first target image displayed on the lens screen of the wearable equipment is matched with the second target image observed through the wearable equipment. If the first target image displayed on the lens screen of the wearable equipment matches with the second target image observed through the wearable equipment, it means that the size of the first target image shot through the camera of the current electronic equipment is consistent with the image size of the preset target observed by the human eye through the lens of the wearable equipment. As shown in FIG. 3, which is a schematic diagram showing that the first target image being overlapped with the second target image according to an embodiment of the present application, and there is no need to adjust the first target image of the electronic equipment. If the first target image displayed on the lens screen of the wearable equipment does not match with the second target image observed through the wearable equipment, it means that the size of the first target image shot through the camera of the current electronic equipment is inconsistent with the image size of the preset target observed by the human eye through the lens of the wearable equipment. In this case, there are two situations: the size of the first target image is larger than the size of the second target image, or the size of the first target image is smaller than the size of the second target image, then the image size parameter of the first target image will be increased or reduced. The image size parameter can be adjusted through a volume key of the electronic equipment. For example, the image can be enlarged or reduced through the volume key of the electronic equipment, or the image can be manually enlarged or reduced by the user on the screen of the electronic equipment, and the specific way of adjusting the image is not limited herein. Then it will return to execute a step of sending the first target image to the wearable equipment until the first target image overlaps with the second target image, and obtain a target adjustment parameter. In another embodiment, in the overlapping and matching process, if the difference value between the size of the first target image and the size of the second target image falls within the preset distance threshold, it means that the first target image successfully matches with the second target image, and the preset distance threshold can be set according to actual conditions. For example, the preset distance threshold is set to 1 mm, which is not specifically limited here. In addition, after obtaining the target adjustment parameter, the camera of the electronic equipment can be calibrated based on the target adjustment parameter, so that the calibrated camera can match with the size of the object in the virtual environment regardless of the angle the calibrated camera turns to, thereby improving the user experience.

The in response to that the first target image does not overlap with the second target image observed through the wearable equipment, adjusting the image size parameter of the first target image, and returning to execute the step of sending the first target image to the wearable equipment until the first target image overlaps with the second target image, and obtaining the target adjustment parameter includes following steps.

Step S31, in response to that the size of the first target image is smaller than the size of the second target image, increasing a image size parameter of the first target image to obtain the first target image after parameter adjustment; and returning to execute the step of sending the first target image to the wearable equipment until the first target image overlaps with the second target image, and configuring the image size parameter corresponding to an overlapped image as the target adjustment parameter.

Figure 4:
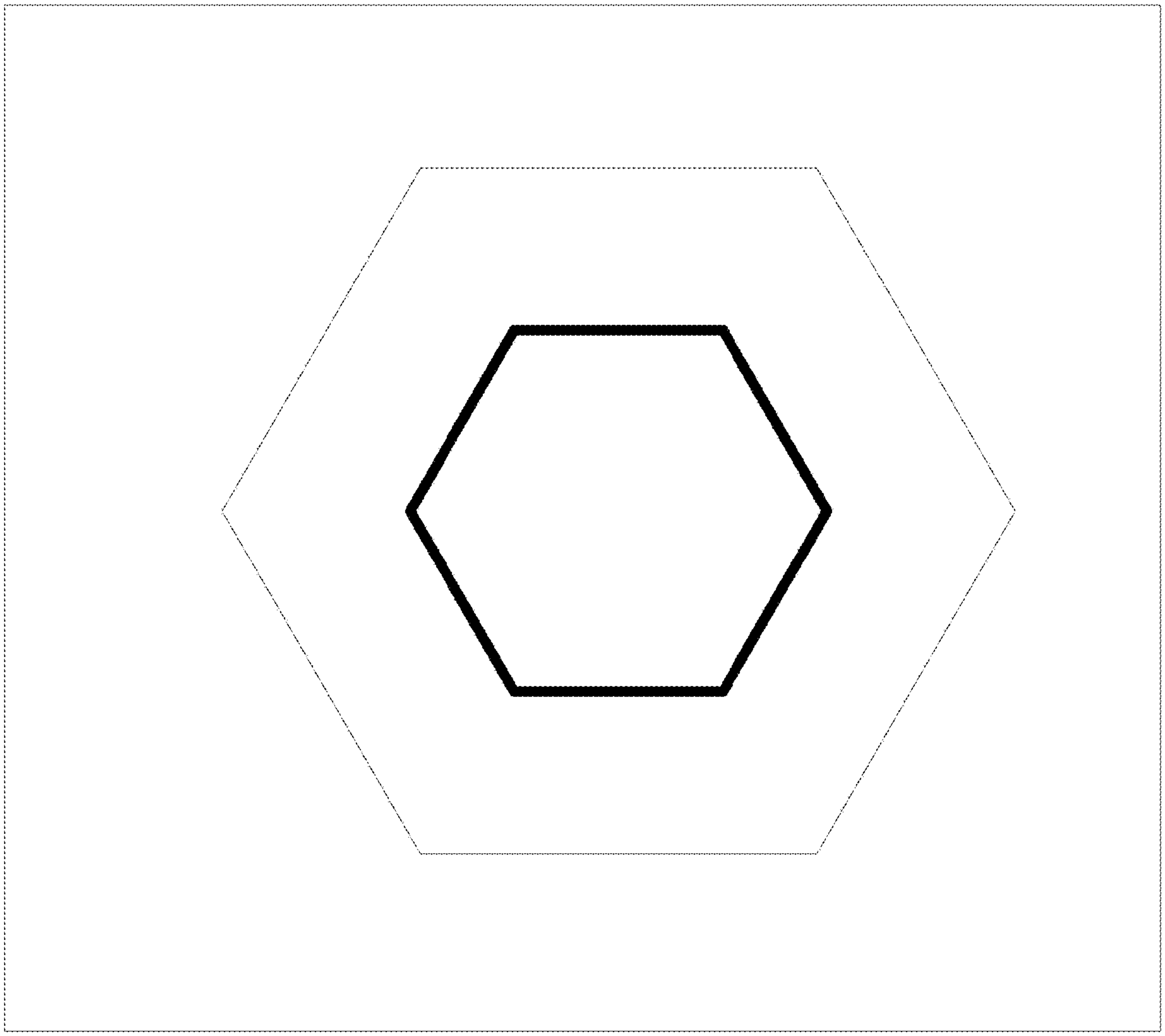
FIG. 4 is a schematic diagram showing that the size of the first target image being smaller than the size of the second target image according to an embodiment of the present application.

In this embodiment, as shown in FIG. 4, which is a schematic diagram showing that the size of the first target image being smaller than the size of the second target image according to an embodiment of the present application. The outer rectangle represents the lens of the wearable equipment. The image with thicker lines represents the second target image, and the image with smaller lines represents the first target image. In an embodiment, if the size of the first target image is smaller than the size of the second target image, it means that the image size parameter of the first target image obtained through the current electronic equipment is too small. Therefore, it is necessary to increase the image size parameter of the first target image, so as to send the first target image after the parameter adjustment to the wearable equipment, and then the first target image will be compared with the second target image again until the first target image overlaps with the second target image. The image size parameter corresponding to the overlapped image can be used as the target adjustment parameter.

Step S32, in response to that the size of the first target image is larger than the size of the second target image, reducing the image size parameter of the first target image to obtain the first target image after parameter adjustment; and returning to execute the step of sending the first target image to the wearable equipment until the first target image overlaps with the second target image, and configuring the image size parameter corresponding to an overlapped image as the target adjustment parameter.

Figure 5:
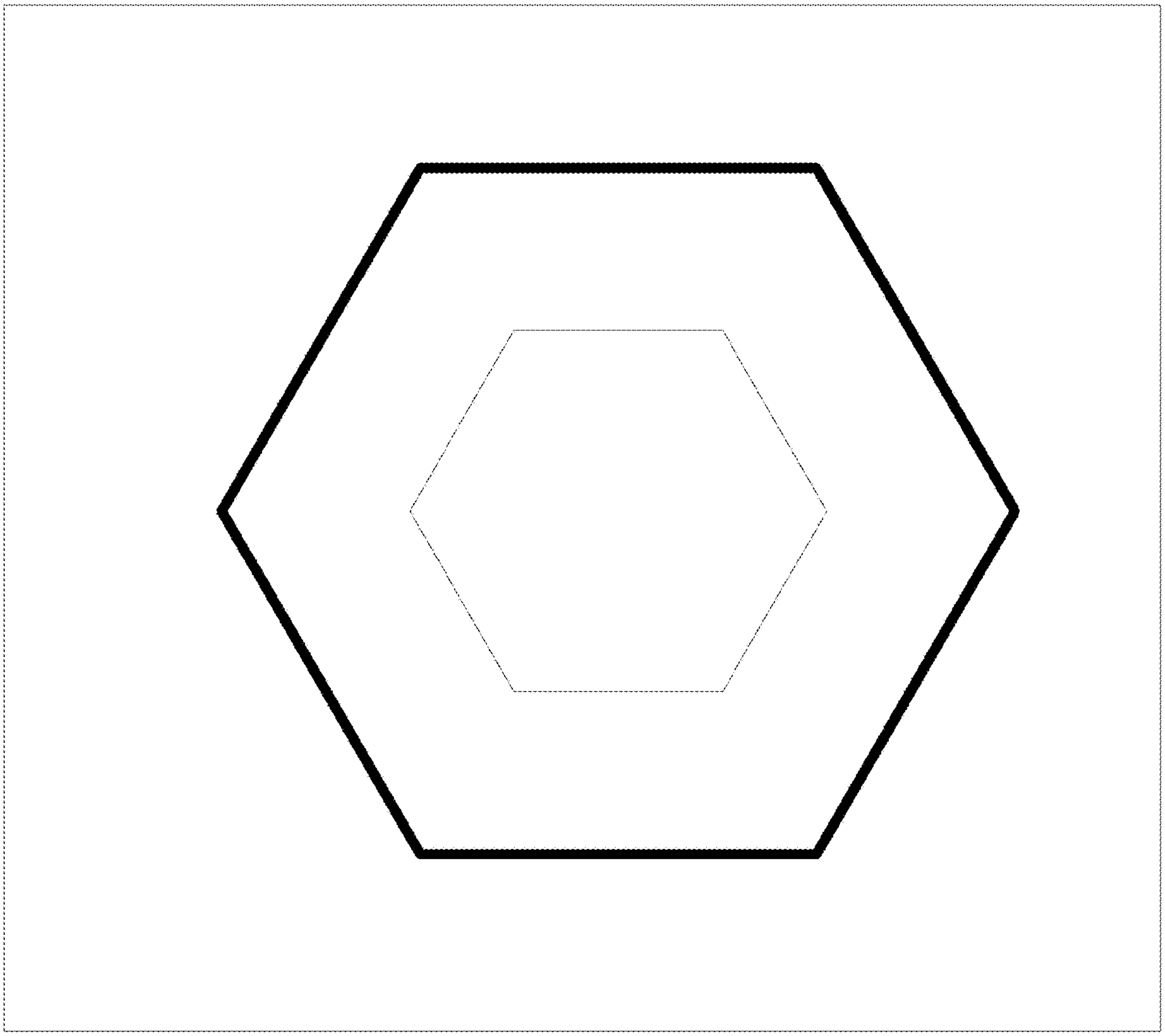
FIG. 5 is a schematic diagram showing that the size of the first target image being larger than the size of the second target image according to an embodiment of the present application.

In this embodiment, as shown in FIG. 5, which is a schematic diagram showing that the size of the first target image being larger than the size of the second target image according to an embodiment of the present application. The outer rectangle represents the lens of the wearable equipment. The image with thicker lines represents the second target image, and the image with smaller lines represents the first target image. In an embodiment, if the size of the first target image is larger than the size of the second target image, it means that the image size parameter of the first target image obtained through the current electronic equipment is too large. Therefore, it is necessary to reduce the image size parameter of the first target image, so as to send the first target image after the parameter adjustment to the wearable equipment, and then the first target image is compared with the second target image again until the first target image overlaps with the second target image. Then the image size parameter corresponding to the overlapped image is used as the target adjustment parameter.

In the embodiment of the present application, the second target image observed through the wearable equipment through the lens is compared with the first target image shot through the electronic equipment. When there is no overlap between the second target image and the first target image, the first target image of the electronic equipment is adjusted until the first target image shot through the electronic equipment can overlap with the second target image observed through the wearable equipment, and the target adjustment parameter of the overlapped image is recorded. Based on the target adjustment parameter, the camera of the electronic equipment is calibrated, so that the calibrated camera can match with the size of the object in the virtual environment regardless of the angle the calibrated camera turns to, thereby improving the user experience.

Figure 6:
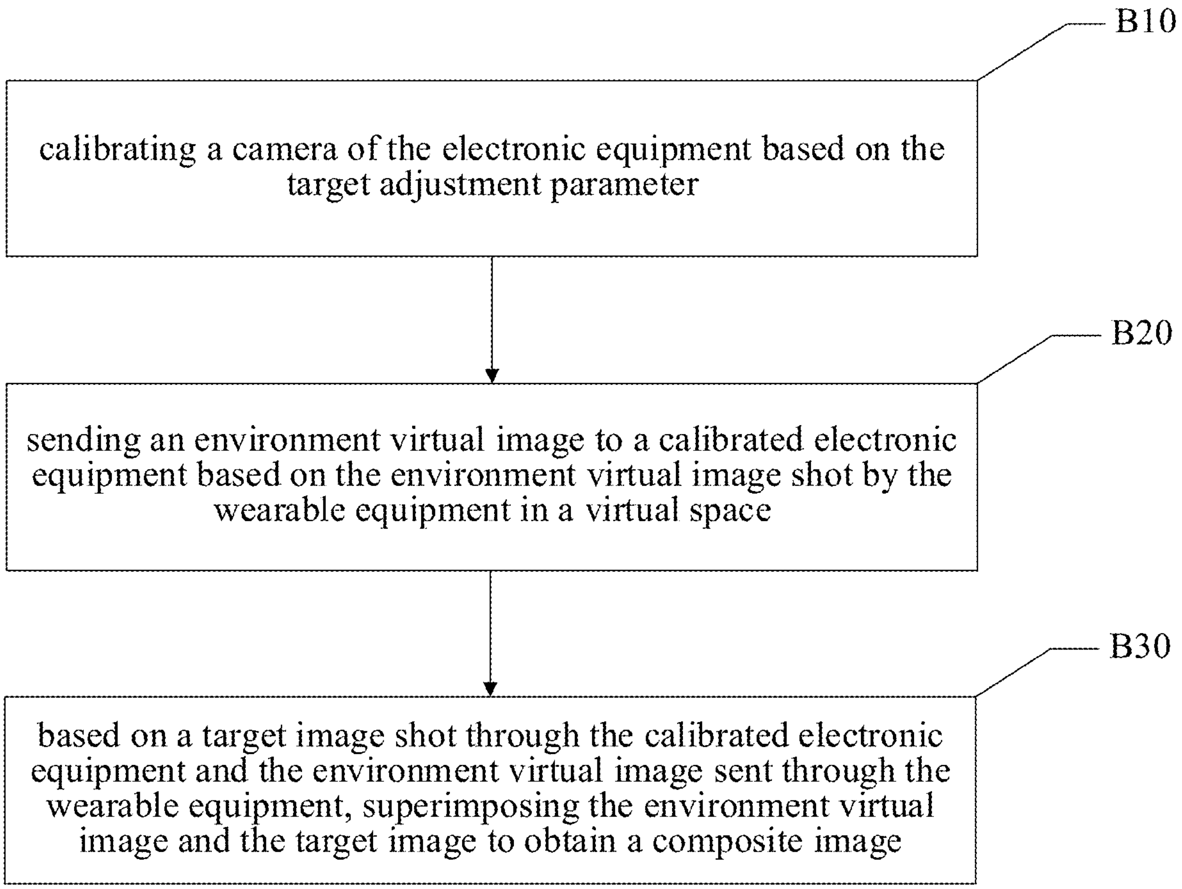
FIG. 6 is a flowchart of the shooting calibration method according to a second embodiment of the present application.

As shown in FIG. 6, based on the first embodiment of the present application, in another embodiment of the present application, after the above step S30, in response to that the first target image does not overlap with a second target image observed through the wearable equipment, adjusting an image size parameter of the first target image, and returning to execute a step of sending the first target image to the wearable equipment until the first target image overlaps with the second target image, and obtaining a target adjustment parameter, the shooting calibration method further includes following steps.

Step B10, calibrating a camera of the electronic equipment based on the target adjustment parameter.

Step B20, sending an environment virtual image to a calibrated electronic equipment based on the environment virtual image shot by the wearable equipment in a virtual space.

Step B30, based on a target image shot through the calibrated electronic equipment and the environment virtual image sent through the wearable equipment, superimposing the environment virtual image and the target image to obtain a composite image.

In this embodiment, based on the target adjustment parameter, the camera of the electronic equipment is calibrated. Based on the environment virtual image shot through the wearable equipment in the virtual space and the target image shot through the calibrated electronic equipment, the wearable equipment transmits the environment virtual image to the electronic equipment. Then the electronic equipment removes the background of the target image, configures the target image after the background is removed as the foreground, and configures the environment virtual image shot through the wearable equipment as the background. After that, the background and the foreground will be superimposed to obtain a composite image. Since the calibrated electronic equipment is used for shooting, the shot target object matches the virtual environment of the wearable equipment. Further, when the user wears the wearable equipment, the electronic equipment sends the stored composite image to the wearable equipment, and the user can observe the composite image on the screen of the wearable equipment, so that only the electronic equipment and the wearable equipment need to be used to achieve the VR shooting, which is convenient and fast, thereby improving the user experience.

In the embodiment of the present application, the corrected electronic equipment is used for shooting, and the shot target image matches the virtual environment of the wearable equipment, so that the obtained composite image is more in line with the actual situation, thereby improving the user experience.

Figure 7:
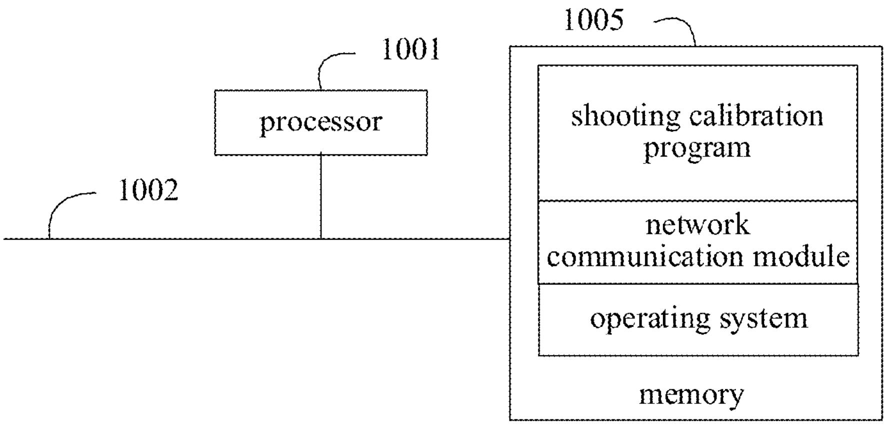
FIG. 7 is a schematic structural diagram of the electronic equipment under the hardware operating environment according to an embodiment of the present application.

As shown in FIG. 7, which is a schematic structural diagram of the electronic equipment under the hardware operating environment according to an embodiment of the present application.

As shown in FIG. 7, the electronic equipment may include a processor 1001, such as a CPU, a memory 1005, and a communication bus 1002. The communication bus 1002 is used to realize the connection and communication between the processor 1001 and the memory 1005. The memory 1005 can be a high-speed RAM memory or a non-volatile memory, such as a disk memory. The memory 1005 can further be a storage device independent of the aforementioned processor 1001.

In an embodiment, the electronic equipment may further include a rectangular user interface, a network interface, a camera, a radio frequency (RF) circuit, a sensor, an audio circuit, a WiFi module, and the like. The rectangular user interface may include a display, an input sub-module, such as a keyboard. The rectangular user interface may further include a standard wired interface and a wireless interface. The network interface may include a standard wired interface and a wireless interface, such as a WIFI interface.

Those skilled in the art will understand that the electronic equipment structure shown in FIG. 7 does not constitute a limitation to the electronic equipment, and may include more or fewer components than shown, or a combination of certain components, or different component arrangements.

As shown in FIG. 7, the memory 1005 as a computer storage medium may include an operating system, a network communication module, and a shooting calibration program. The operating system is a program that manages and controls the hardware and software resources of the electronic equipment, and supports the operation of the shooting calibration program and other software and/or programs. The network communication module is used to realize the communication between the components inside the memory 1005, and to communicate with other hardware and software in the shooting calibration system.

In the electronic equipment shown in FIG. 7, the processor 1001 is used to execute the shooting calibration program stored in the memory 1005, and to implement the steps of the shooting calibration method described in any of the above embodiments.

The specific implementation of the electronic equipment in the present application is basically the same as the above-mentioned shooting calibration method, which will not be repeated here.

Figure 8:
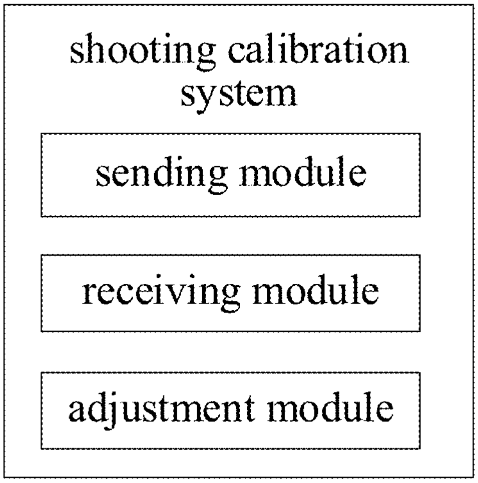
FIG. 8 is a schematic diagram of functional modules of the shooting calibration system of the present application.

In addition, as shown in FIG. 8, which is a schematic diagram of functional modules of the shooting calibration system of the present application. The present application further provides a shooting calibration system, which includes:

- a sending module, configured to obtain a first target image shot by the electronic equipment, and send the first target image to the wearable equipment;
- a receiving module, configured to receive the first target image sent by the electronic equipment through the wearable equipment;
- an adjustment module, configured to adjust an image size parameter of the first target image in response to that the first target image does not overlap with the second target image observed through the wearable equipment, and return to execute a step of sending the first target image to the wearable equipment until the first target image overlaps with the second target image, and obtain a target adjustment parameter.

In an embodiment, the sending module is further used for:

- shooting, by a camera of the electronic equipment, a preset target, to obtain a target image; and
- removing background of the target image to obtain the first target image, and transmitting the first target image to the wearable equipment.

In an embodiment, the shooting calibration system is further used for:

- projecting the first target image on a lens screen of the wearable equipment;
- determining a offset between the second target image and the first target image; and
- performing image offset compensation on the first target image based on the offset, to determine whether the second target image overlaps with the offset-compensated first target image.

In an embodiment, the correction module is further used for:

- in response to that the size of the first target image is smaller than the size of the second target image, increasing a image size parameter of the first target image to obtain the first target image after parameter adjustment; and returning to execute the step of sending the first target image to the wearable equipment until the first target image overlaps with the second target image, and configuring the image size parameter corresponding to an overlapped image as the target adjustment parameter.

In an embodiment, the correction module is further used for:

in response to that the size of the first target image is larger than the size of the second target image, reducing the image size parameter of the first target image to obtain the first target image after parameter adjustment; and returning to execute the step of sending the first target image to the wearable equipment until the first target image overlaps with the second target image, and configuring the image size parameter corresponding to an overlapped image as the target adjustment parameter.

In an embodiment, the shooting calibration system is further used for:

calibrating a camera of the electronic equipment based on the target adjustment parameter;

sending an environment virtual image to a calibrated electronic equipment based on the environment virtual image shot by the wearable equipment in a virtual space; and based on a target image shot through the calibrated electronic equipment and the environment virtual image sent by the wearable equipment, superimposing the environment virtual image and the target image to obtain a composite image.

The specific implementation of the shooting calibration system of the present application is basically the same as the above-mentioned shooting calibration method, which will not be repeated here.

Embodiments of the present application provide a storage medium, and the storage medium is a non-transitory computer-readable storage medium. The non-transitory computer-readable storage medium stores one or more programs. When the one or more programs are executed by one or more processors, steps of the shooting calibration method described in any one of the above embodiments are implemented.

The specific implementation of the non-transitory computer-readable storage medium of the present application is basically the same as the various embodiments of the shooting calibration method described above, which will not be repeated here.

The above are only some embodiments of the present application, and do not limit the scope of the present application thereto. Under the concept of the present application, any equivalent structural transformation or equivalent process transformation made according to the description and drawings of the present application, or direct/indirect application in other related technical fields shall fall within the claimed scope of the present application.

What is claimed is:

1. A shooting calibration method, applied to a shooting calibration system, wherein the shooting calibration system comprises an electronic equipment and a wearable equipment, and the electronic equipment is communicated with the wearable equipment; the shooting calibration method comprises:

shooting, by the electronic equipment, a first target image, and sending the first target image to the wearable equipment;

receiving, by the wearable equipment, the first target image sent by the electronic equipment; and in response to that the first target image does not overlap with a second target image observed through the wearable equipment, adjusting an image size parameter of the first target image, and returning to execute a step of sending the first target image to the wearable equipment until the first target image overlaps with the second target image, and obtaining a target adjustment parameter, wherein after the receiving, by the wearable equipment, the first target image sent by the electronic equipment, the shooting calibration method further comprises:

projecting the first target image on a lens screen of the wearable equipment;

determining a offset between the second target image and the first target image; and performing image offset compensation on the first target image based on the offset, to determine whether the second target image overlaps with the first target image after the offset compensation.

2. The shooting calibration method according to claim 1, wherein a shooting angle corresponding to a camera of the electronic equipment is consistent with a shooting angle corresponding to the wearable equipment, and a shooting sight corresponding to the camera of the electronic equipment is consistent with a shooting sight corresponding to the wearable equipment.

3. The shooting calibration method according to claim 1, wherein the shooting, by the electronic equipment, the first target image, and sending the first target image to the wearable equipment comprises:

shooting, by a camera of the electronic equipment, a preset target, to obtain a target image; and removing background of the target image to obtain the first target image, and transmitting the first target image to the wearable equipment.

4. The shooting calibration method according to claim 1, wherein the in response to that the first target image does not overlap with the second target image observed through the wearable equipment, adjusting the image size parameter of the first target image, and returning to execute the step of sending the first target image to the wearable equipment until the first target image overlaps with the second target image, and obtaining the target adjustment parameter comprises:

in response to that a size of the first target image is smaller than a size of the second target image, increasing the image size parameter of the first target image to obtain the first target image after parameter adjustment; and returning to execute the step of sending the first target image to the wearable equipment until the first target image overlaps with the second target image, and configuring the image size parameter corresponding to an overlapped image as the target adjustment parameter.

5. The shooting calibration method according to claim 1, wherein the in response to that the first target image does not overlap with the second target image observed through the wearable equipment, adjusting the image size parameter of the first target image, and returning to execute the step of sending the first target image to the wearable equipment until the first target image overlaps with the second target image, and obtaining the target adjustment parameter comprises:

in response to that a size of the first target image is larger than a size of the second target image, reducing the image size parameter of the first target image to obtain the first target image after parameter adjustment; and returning to execute the step of sending the first target image to the wearable equipment until the first target image overlaps with the second target image, and configuring the image size parameter corresponding to an overlapped image as the target adjustment parameter.

6. The shooting calibration method according to claim 1, wherein after the in response to that the first target image does not overlap with the second target image observed through the wearable equipment, adjusting the image size parameter of the first target image, and returning to execute the step of sending the first target image to the wearable equipment until the first target image overlaps with the second target image, and obtaining the target adjustment parameter, the shooting calibration method further comprises:

calibrating a camera of the electronic equipment based on the target adjustment parameter;

sending an environment virtual image to a calibrated electronic equipment based on the environment virtual image shot by the wearable equipment in a virtual space; and based on a target image shot through the calibrated electronic equipment and the environment virtual image sent by the wearable equipment, superimposing the environment virtual image and the target image to obtain a composite image.

7. An electronic equipment, comprising a camera, a memory, a processor, and a shooting calibration program stored in the memory, wherein when the shooting calibration program is executed by the processor, the shooting calibration method according to claim 1 is implemented.

8. A storage medium, wherein the storage medium is a non-transitory computer-readable storage medium, a shooting calibration program is stored on the non-transitory computer-readable storage medium, and when the shooting calibration program is executed by a processor, the shooting calibration method according to claim 1 is implemented.

* * * * *